No. 650,753. Patented May 29, 1900.
A. B. GIBSON.
WASHER.
(Application filed Dec. 12, 1899.)
(No Model.)
Fig. 1.
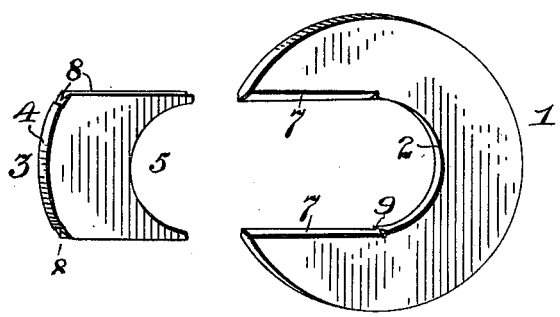
Fig. 2. Fig. 3.
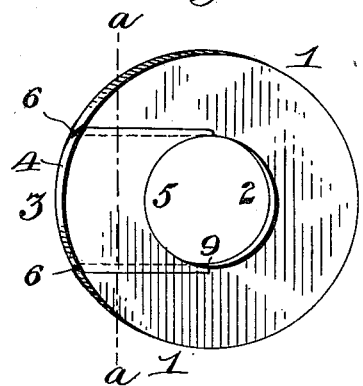 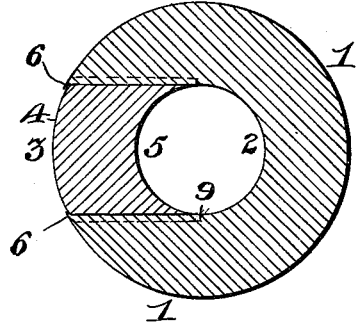
Fig. 4.
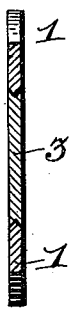
Witnesses
Severance.
Allan W. Fuss.
Inventor
Albert B. Gibson
by Mason Fenwick Lawrence
his Attorney
THE NORRIS PETERS CO., PHOTO-LITHO., WASHINGTON, D. C.

UNITED STATES PATENT OFFICE.

ALBERT B. GIBSON, OF POLK COUNTY, OREGON.

WASHER.

SPECIFICATION forming part of Letters Patent No. 650,753, dated May 29, 1900.

Application filed December 12, 1899. Serial No. 740,091. (No model.)

*To all whom it may concern:*

Be it known that I, ALBERT B. GIBSON, a citizen of the United States, residing in the county of Polk, in the State of Oregon, have invented certain new and useful Improvements in Washers; and I do hereby declare the following to be a full, clear, and exact description of the invention, such as will enable others skilled in the art to which it appertains to make and use the same.

My invention relates to a washer or bushing which is adapted to be applied on shafting of machinery between the boxing and the shoulder for taking up the wear between said parts and on other parts of machinery without the necessity of removing the parts.

The object of my invention is the production of a washer or bushing which can be readily applied to shafting and other parts of machinery to take up wear and without the necessity of removing any of the parts of the machine, and which when applied will be held permanently in place, as will be hereinafter set forth.

With this object in view my invention consists in a washer or bushing the parts of which are constructed, arranged, and combined in the manner hereinafter fully described and afterward specifically pointed out in the claims.

In the accompanying drawings, Figure 1 is a perspective view of a washer or bushing constructed in accordance with my invention and showing the removable section or key to one side. Fig. 2 is a perspective view of the same in a completed condition. Fig. 3 is a vertical section through the same, and Fig. 4 is a sectional view taken on the line *a a* of Fig. 2.

In the accompanying drawings, 1 represents a washer or bushing whose outline or periphery is circular and which is provided with an inner segmental periphery 2.

3 represents a removable section or key which is provided with a convex outer periphery 4, which when the said section is applied within the main body portion of the washer or bushing continues the general outline thereof. This removable section or key is provided on its inner edge with a concave or segmental portion 5, which when the section is applied in position within the main body portion of the washer or bushing continues the general curvature of the inner periphery thereof, so as to form a complete eye.

The washer or bushing may be made of any desired thickness to suit the use to which it is put and to take up the desired amount of wear. To secure the removable section in place within the main body portion of the washer or bushing, the outer edge of the said main body portion at the points where it joins the outer edge of the removable section is hammered or mashed over on said section, as clearly shown at 6 in Fig. 3 of the drawings. The upper outer corners of the removable section or key 3 are slightly cut out or filed away, as shown, to receive the corners of the main body portion when they are hammered or mashed over.

It is obvious that when it is desired to apply the washer or bushing to the shafting of a machine between the shoulder and the boxing or between other parts where it is desired to take up water, and especially in shafting which employs beveled gearing, the main body portion of the washer or bushing can be dropped into place between said boxing and shoulder and the removable section or key driven in and the corners or edges hammered over, as above described, to hold said removable section in place.

In order to automatically hold the removable section in place before the bushing or washer is applied to a machine, the edges of the main body portion, as at 7, are preferably formed with a tongue, and the side edges of the removable section are grooved, as at 8, so as to be readily slid in and out upon said tongues on the body portion of the washer, by reason of which construction the removable section is prevented from dropping out laterally. I regard this as an important feature of my invention, as it enables me to ship the washers or bushings with less liability of the parts becoming accidentally separated.

In order to prevent the washer or bushing being driven too tight on the shaft when the corners of the main body portion are being hammered over to hold the removable section in place, I provide a shoulder or seat 9 in the main body portion, so that the inner corners of the removable section will abut against the same when in place, and said section will be prevented from being forced any farther in. While I have described the tongue portion as being on the main body portion and the grooves as being on the removable section, it is obvious that this might be reversed without departing from the spirit of my invention.

Having now described my invention, what I claim as new, and desire to secure by Letters Patent, is—

1. A washer or bushing comprising a body with the usual central circular aperture and cut away at one side on parallel lines extending tangentially from opposite sides of the circular aperture to the outer periphery, the parallel walls of said opening being tongued or grooved throughout, and shoulders being formed at their inner ends in the periphery of the central aperture, and an inner tongue or key formed to fit the parallel walls of said opening and to be stopped in its inward sliding movement by said shoulders, substantially as described.

2. A washer or bushing having the usual curved outer periphery and the usual central opening, a part of the washer bounded by parallel lines tangential to opposite points of the periphery of the central opening and extending to the outer periphery, being made slidable and removable, the metal at the outer extremities at the sides of the openings in which the removable section is slidable being arranged to be mashed or hammered over against the outer ends of said removable section to prevent the withdrawal thereof, substantially as and for the purpose set forth.

3. The herein-described washer or bushing comprising the body provided with the usual central circular aperture and cut away at one side on parallel lines extending tangentially from opposite sides of the circular aperture to the outer periphery, the parallel sides of the said opening being tongued or grooved and shoulders being formed at their inner ends in the periphery of the central aperture, and the tongue or key formed to fit the parallel sides of said opening and to be stopped in its inward sliding by said shoulders, the outer ends of the edges of the opening being arranged to be hammered or mashed upon the outer ends of the tongue or key, substantially as and for the purpose set forth.

4. As an improved article of manufacture, a comparatively-thin washer or bushing consisting of a body portion with the usual central circular aperture and cut away at one side on parallel lines extending tangentially from opposite sides of the circular aperture to the outer periphery, the parallel walls of said opening being tongued or grooved from the periphery of the washer to the central aperture thereof, and a single flat tongue or key of substantially the same thickness throughout and of substantially the same thickness as the body of the washer to fit the parallel walls of the opening and to be stopped in its inward sliding movement by said shoulders, substantially as described.

In testimony whereof I hereunto affix my signature in presence of two witnesses.

ALBERT B. GIBSON.

Witnesses:
JOHN BAYNE,
JESSE D. WALLINS.